United States Patent
Fujishiro et al.

(10) Patent No.: US 10,070,446 B2
(45) Date of Patent: Sep. 4, 2018

(54) COMMUNICATION CONTROL METHOD, BASE STATION, AND USER TERMINAL (71) Applicant: KYOCERA CORPORATION, Kyoto (JP)

(72) Inventors: Masato Fujishiro, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 149 days.

(21) Appl. No.: 15/031,146

(22) PCT Filed: Oct. 23, 2014

(86) PCT No.: PCT/JP2014/078241
§ 371 (c)(1),
(2) Date: Apr. 21, 2016

(87) PCT Pub. No.: WO2015/064474
PCT Pub. Date: May 7, 2015

(65) Prior Publication Data
US 2016/0255637 A1 Sep. 1, 2016

(30) Foreign Application Priority Data
Oct. 29, 2013 (JP) ................................. 2013-224774

(51) Int. Cl.
H04W 72/08 (2009.01)
H04L 5/00 (2006.01)
(Continued)

(52) U.S. Cl.
CPC ......... *H04W 72/082* (2013.01); *H04L 5/0005* (2013.01); *H04L 5/0048* (2013.01);
(Continued)

(58) Field of Classification Search
CPC .... H04L 5/0005; H04L 5/0078; H04W 16/10; H04W 16/32; H04W 72/042;
(Continued)

(56) References Cited

U.S. PATENT DOCUMENTS 9,131,513 B2 * 9/2015 Cai ..................... H04W 72/082
9,231,723 B2 * 1/2016 Zhu ..................... H04W 76/048
(Continued)

FOREIGN PATENT DOCUMENTS

| JP | 2012-235341 A | 11/2012 |
| JP | 2013-219700 A | 10/2013 |
| WO | 2010/032791 A1 | 3/2010 |

OTHER PUBLICATIONS

International Search Report issued in PCT/JP2014/078241; dated Jan. 20, 2015.
(Continued)

Primary Examiner — Ahmed Elallam
(74) Attorney, Agent, or Firm — Studebaker & Brackett PC (57) ABSTRACT A communication control method used in a mobile communication system in which in order to suppress an interference from a first cell to a second cell, a use-restricted subframe is set in the first cell comprises a coordinated transmission step of performing, in the use-restricted subframe, a coordinated transmission from the first cell and the second cell to a user terminal connected to the second cell.

8 Claims, 6 Drawing Sheets (51) Int. Cl.
*H04W 72/04* (2009.01)
*H04W 72/12* (2009.01)
*H04W 16/32* (2009.01)
*H04W 16/10* (2009.01)
*H04W 88/08* (2009.01)

(52) U.S. Cl.
CPC ..... *H04W 72/042* (2013.01); *H04W 72/0446* (2013.01); *H04W 72/12* (2013.01); *H04W 16/10* (2013.01); *H04W 16/32* (2013.01); *H04W 88/08* (2013.01)

(58) Field of Classification Search
CPC ........... H04W 72/0446; H04W 72/082; H04W 72/12; H04W 72/085; H04W 72/087; H04W 72/0406
See application file for complete search history.

(56) References Cited

U.S. PATENT DOCUMENTS

| | | | |
|---|---|---|---|
| 9,357,405 B2* | 5/2016 | Seo | H04J 11/0053 |
| 9,820,297 B2* | 11/2017 | Huang | H04W 72/1289 |
| 2011/0218016 A1 | 9/2011 | Hirakawa et al. | |
| 2012/0113812 A1* | 5/2012 | Ji | H04W 72/1263 370/241 |
| 2012/0122472 A1* | 5/2012 | Krishnamurthy | H04L 5/0053 455/456.1 |
| 2013/0196675 A1* | 8/2013 | Xiao | H04W 72/082 455/452.1 |
| 2013/0272274 A1 | 10/2013 | Ishida et al. | |
| 2013/0315087 A1* | 11/2013 | Zhang | H04W 24/10 370/252 |
| 2013/0322350 A1* | 12/2013 | Gaur | H04L 1/0013 370/329 |
| 2013/0343270 A1* | 12/2013 | Abe | H04W 36/0005 370/328 |
| 2014/0016598 A1* | 1/2014 | Kwon | H04L 5/0023 370/329 |
| 2014/0036870 A1* | 2/2014 | Skov | H04W 36/0088 370/331 |
| 2014/0112253 A1 | 4/2014 | Nagata et al. | |
| 2014/0192734 A1* | 7/2014 | Ng | H04L 5/0035 370/329 |
| 2016/0066315 A1* | 3/2016 | Zhang | H04W 72/1226 370/329 |
| 2016/0374098 A1* | 12/2016 | Jongren | H04L 1/0026 |

OTHER PUBLICATIONS

Written Opinion issued in PCT/JP2014/078241; dated Jan. 20, 2015.

3rd Generation Partnership Project; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); Sep. 2013; pp. 1-209; 3GPP TS 36.300 V11.7.0; 3GPP Organizational Partners.

KDDI; Performance Evaluations of JT-CoMP and TDM-eICIC in the CoMP Scenario 3; 3GPP TSG-RAN WG1 Meeting #66 R1-112062; Aug. 22-26, 2011; pp. 1-8; Athens, Greece.

* cited by examiner

COMMUNICATION CONTROL METHOD, BASE STATION, AND USER TERMINAL

TECHNICAL FIELD

The present invention relates to a mobile communication control method, a base station, and a user terminal, used in a mobile communication system.

BACKGROUND ART

In the LTE (Long Term Evolution) of which the specifications are designed in 3GPP (3rd Generation Partnership Project) which is a project aiming to standardize a mobile communication system, ICIC (Inter-Cell Interference Coordination) is introduced to suppress an inter-cell interference (see Non Patent Literature 1, for example).

Such ICIC includes a time region ICIC. In the time region ICIC, when there is a second cell (victim cell) that receives a strong downlink interference from a first cell (aggressor cell), a part of a downlink subframe is set to a use-restricted subframe in the first cell to rescue the second cell. Such a use-restricted subframe is called ABS (Almost Blank Subframe).

However, in the above-described time region ICIC, there is a room for improvement in terms of implementing an effective utilization of the use-restricted subframe (ABS).

CITATION LIST

Patent Literature

[NPL 1] 3GPP Technical Specification "TS 36.300 V11.7.0" September, 2013

SUMMARY OF INVENTION

A communication control method according to a first aspect is used in a mobile communication system in which in order to suppress an interference from a first cell to a second cell, a use-restricted subframe is set in the first cell. The communication control method comprises a coordinated transmission step of performing, in the use-restricted subframe, a coordinated transmission from the first cell and the second cell to a user terminal connected to the second cell.

A base station according to a second aspect manages at least a first cell in a mobile communication system in which in order to suppress an interference from the first cell to a second cell, a use-restricted subframe is set in the first cell. The base station comprises a controller configured to control the first cell so as to perform, in the use-restricted subframe, a coordinated transmission with the second cell, to a user terminal connected to the second cell.

A user terminal according to a third aspect is connected to a second cell in a mobile communication system in which in order to suppress an interference from a first cell to the second cell, a use-restricted subframe is set in the first cell. The user terminal comprises a receiver configured to receive, in the use-restricted subframe, data transmitted, by a coordinated transmission, from the first cell and the second cell.

DESCRIPTION OF EMBODIMENTS

Overview of Embodiments

A communication control method according to embodiments is used in a mobile communication system in which in order to suppress an interference from a first cell to a second cell, a use-restricted subframe is set in the first cell. The communication control method comprises a coordinated transmission step of performing, in the use-restricted subframe, a coordinated transmission from the first cell and the second cell to a user terminal connected to the second cell.

In the embodiments, in the coordinated transmission step, the first cell uses at least a part of a PDSCH (Physical Downlink Shared Channel) resource of the use-restricted subframe to perform the coordinated transmission, without using a PDCCH (Physical Downlink Control Channel) resource of the use-restricted subframe.

In the embodiments, in the coordinated transmission step, the first cell performs, in the use-restricted subframe, the coordinated transmission while avoiding a use of the PDSCH resource corresponding to a CRS (Cell specific Reference Signal) resource of the second cell.

In the embodiments, the communication control method further comprises the steps of: transmitting information indicating the use-restricted subframe from a first base station that manages the first cell to a second base station that manages the second cell; and transmitting coordinated transmission information for performing the coordinated transmission from the second base station to the first base station. In the coordinated transmission step, the first base station that receives the coordinated transmission information performs the coordinated transmission on the basis of the coordinated transmission information.

In the embodiments, the coordinated transmission information is information for requesting to perform the coordinated transmission.

In the embodiments, the communication control method further comprises the step of: performing beforehand, by the second base station, scheduling of the user terminal for the use-restricted subframe. The coordinated transmission information includes scheduling information obtained by the scheduling.

In the embodiments, the scheduling information is at least one of: a resource block assigned, in the use-restricted subframe, to the user terminal; and a transport format applied, in the use-restricted subframe, to the user terminal.

In the embodiments, the coordinated transmission information includes data scheduled to be transmitted, in the use-restricted subframe, from the second cell to the user terminal.

In the embodiments, the coordinated transmission is JT (Joint Transmission) in which the same data is transmitted, by the same time-frequency resource and the same transport format, from the first cell and the second cell.

A base station according to the embodiments manages at least a first cell in a mobile communication system in which in order to suppress an interference from the first cell to a second cell, a use-restricted subframe is set in the first cell. The base station comprises a controller configured to control the first cell so as to perform, in the use-restricted subframe, a coordinated transmission with the second cell, to a user terminal connected to the second cell.

A user terminal according to the embodiments is connected to a second cell in a mobile communication system in which in order to suppress an interference from a first cell to the second cell, a use-restricted subframe is set in the first cell. The user terminal comprise a receiver configured to receive, in the use-restricted subframe, data transmitted, by a coordinated transmission, from the first cell and the second cell.

Embodiments

Hereinafter, an embodiment will be described using an example of LTE system.

(System Configuration)

Figure 1:
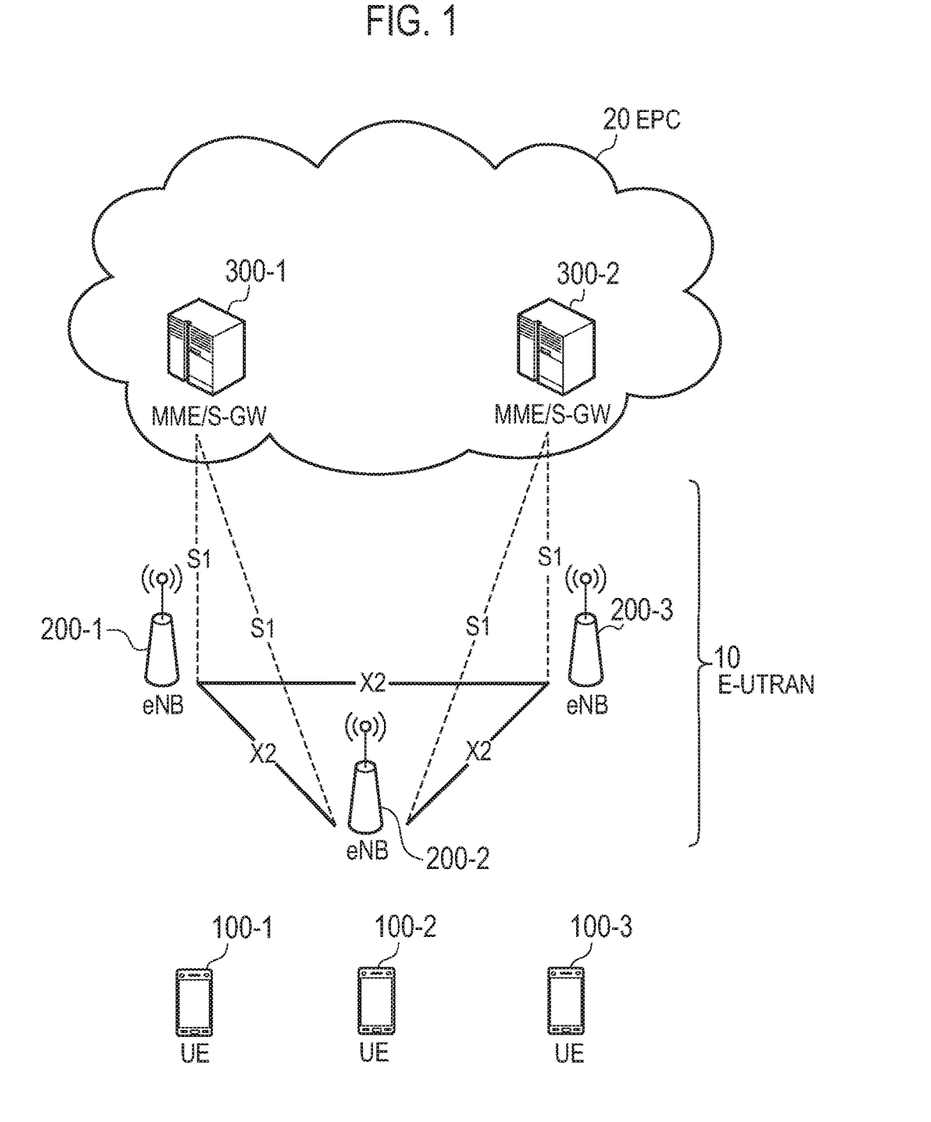
FIG. 1 is a configuration diagram of an LTE system according to an embodiment.

FIG. 1 is a configuration diagram of an LTE system according to embodiments. As illustrated in FIG. 1, the LTE system according to the embodiments includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The network of LTE system is constituted by the E-UTRAN 10 and the EPC 20. The EPC 20 includes a plurality of MME (Mobility Management Entity)/S-GWs (Serving-Gateways) 300. The MME performs various mobility controls and the like for the UE 100. The S-GW performs control to transfer user data. MME/S-GW 300 is connected to eNB 200 via an S1 interface. Furthermore, the EPC 200 includes an operation maintenance server (OAM: Operation And Maintenance) managed by the operator.

Figure 2:
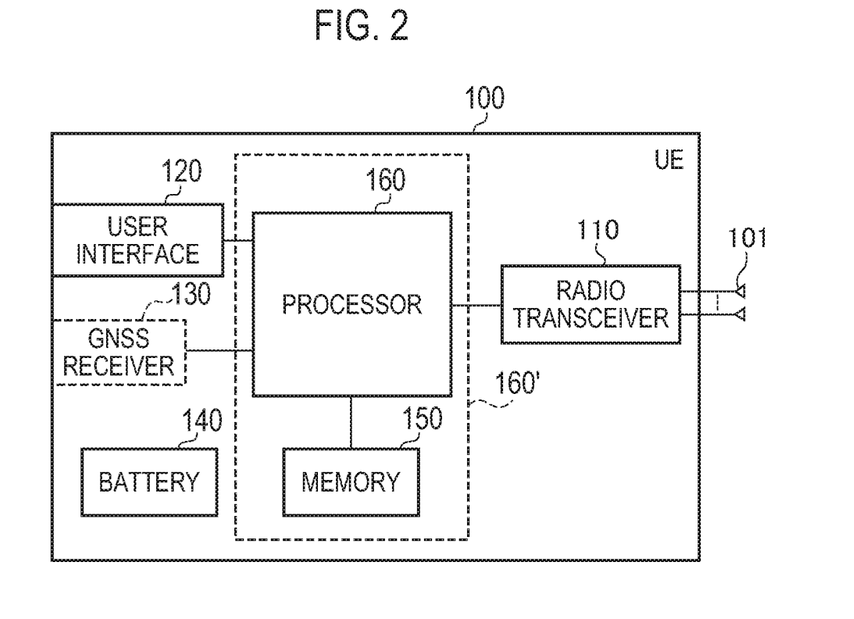
FIG. 2 is a block diagram of a UE according to the embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 corresponds to a storage unit. The processor 160 (and the memory 150) constitute a controller. The UE 100 may not have the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain UE location information (longitude and latitude, etc.) indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
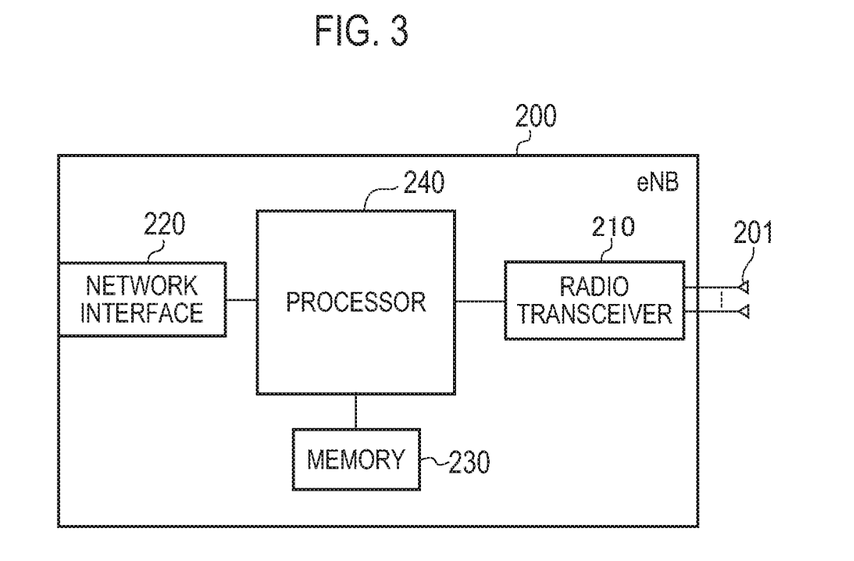
FIG. 3 is a block diagram of an eNB according to the embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 corresponds to a storage unit. The processor 240 (and the memory 230) constitute a controller.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
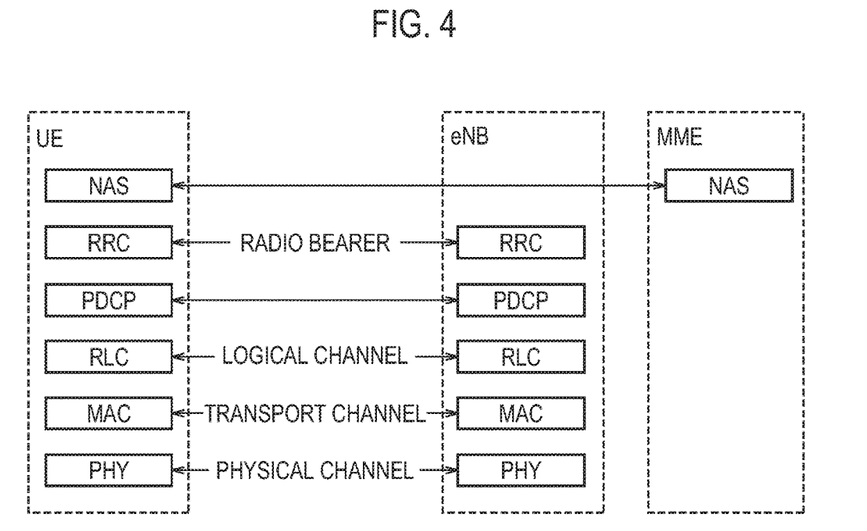
FIG. 4 is a protocol stack diagram of a radio interface according to the embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control signal are transmitted via the physical channel.

The MAC layer performs priority control of data, a retransmission process by hybrid ARQ (HARQ), and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), otherwise the UE 100 is in an idle state (an RRC idle state).

A NAS (Non-Access Stratum) layer positioned above the RRC layer performs a session management, a mobility management and the like.

Figure 5:
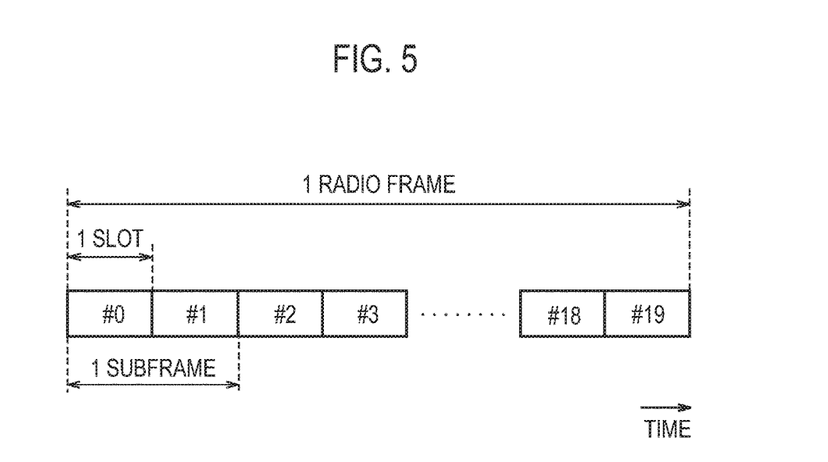
FIG. 5 is a configuration diagram of a radio frame according to the embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively. As a duplex scheme, one of a FDD (Frequency Division Duplex) scheme and a TDD (Time Division Duplex) scheme is applied.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. One subcarrier and one symbol constitute one resource element (RE).

Among radio resources assigned to the UE 100, a frequency resource can be specified by a RB and a time resource can be specified by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data. Moreover, reference signals such as cell specific reference signal (CRS: Cell specific Reference Signal) are separately arranged in each subframe. Moreover, in some of the subframes, primary synchronization signal (PSS) and secondary synchronization signal (SSS) are arranged.

Each cell is assigned with a cell identifier for identifying a cell. The cell identifier includes a physical cell identifier (PCI), a cell global identifier (ECGI), and the like.

The PCI is configured by 8 bits, and mainly used in the physical layer. The number of PCIs defined in the specifications is 504. Further, 504 signal sequences of a CRS are prepared, and the signal sequences are associated with a PCI. The PCIs are divided into 168 cell ID groups and three cell IDs are included in each cell ID group (168×3=504).

During searching a cell, the UE 100 identifies the PCI of the cell by a PSS and an SSS received from the cell. Specifically, a value of the PSS is associated with (three) cell IDs in a cell ID group, and a value of the SSS is associated with (168) cell ID groups. A combination of the PSS and the SSS identifies the PCI. Further, the PSS and the SSS synchronize a downlink frame level.

The UE 100 receives a CRS on the basis of a PCI after identifying the PCI of the cell by a combination of the PSS and the SSS. The CRS provides downlink symbol synchronization and frequency synchronization. The CRS is provided in a first OFDM symbol and a third-to-last OFDM symbol in a slot at six subcarrier intervals. Further, CRSs are divided into six frequency shift amount groups (hereinafter, referred to as "CRS frequency shift group") depending on a PCI. The CRS is utilized for UE measurement (RSRP measurement, for example) for mobility control.

In the uplink, both ends in the frequency direction of each subframe are control regions used as a physical uplink control channel (PUCCH) for mainly transmitting a control signal. Furthermore, the other portion of each subframe is a region available as a physical uplink shared channel (PUSCH) for mainly transmitting user data.

Operation Environment According to Embodiment

Figure 6:
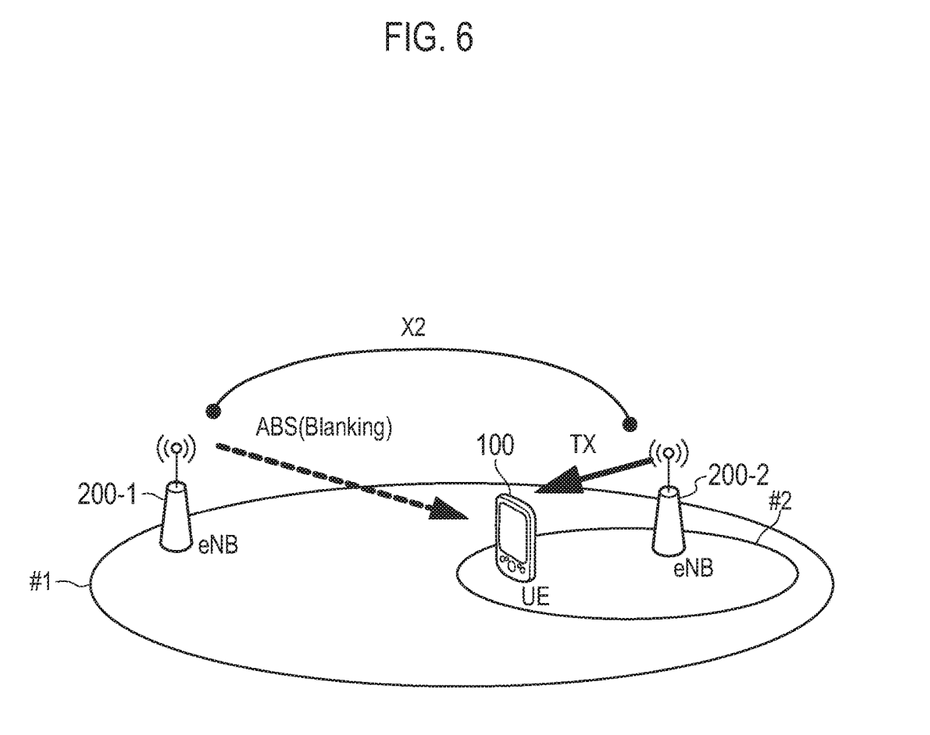
FIG. 6 is a diagram for describing an operation environment according to the embodiment.

FIG. 6 is a diagram for describing an operation environment according to the embodiment. In the embodiment, an operation environment including a plurality of cells having a different coverage size (so-called HetNet environment) is assumed.

As shown in FIG. 6, a cell #1 is a cell having a large coverage size (macro cell, for example). An eNB 200-1 manages the cell #1. A cell #2 is a cell having a small coverage size (a pico cell or a femto cell, for example). The eNB 200-2 manages the cell #2. In the embodiment, the cell #1 corresponds to a first cell, and the cell #2 corresponds to a second cell. The cell #2 is connected with the UE 100.

The cell #2 is provided within the coverage of the cell #1. Further, the cell #2 belongs to the same frequency (Co-channel) as the frequency to which the cell #1 belongs. Thus, the cell #2 receives a strong downlink interference from the cell #1. To suppress such a downlink interference, the time region ICIC is applied. In the time region ICIC, in the cell #1, when a part of the downlink subframe is set to the ABS, the cell #2 is rescued. In the embodiment, the ABS corresponds to a use-restricted subframe. The ABS is a subframe in which a transmission power is restricted (including no transmission) in some physical channels, and/or an activity is restricted.

When the ABS is set in the cell #1, the UE 100 connected to the cell #2 is capable of suppressing, in a radio resource corresponding to the ABS, the downlink interference from the cell #1. However, when the cell #1 is concerned, the use of the radio resource corresponding to the ABS is restricted, and thus, the usage efficiency of the radio resource decreases.

Communication Control Method According to Embodiment

Figure 7:
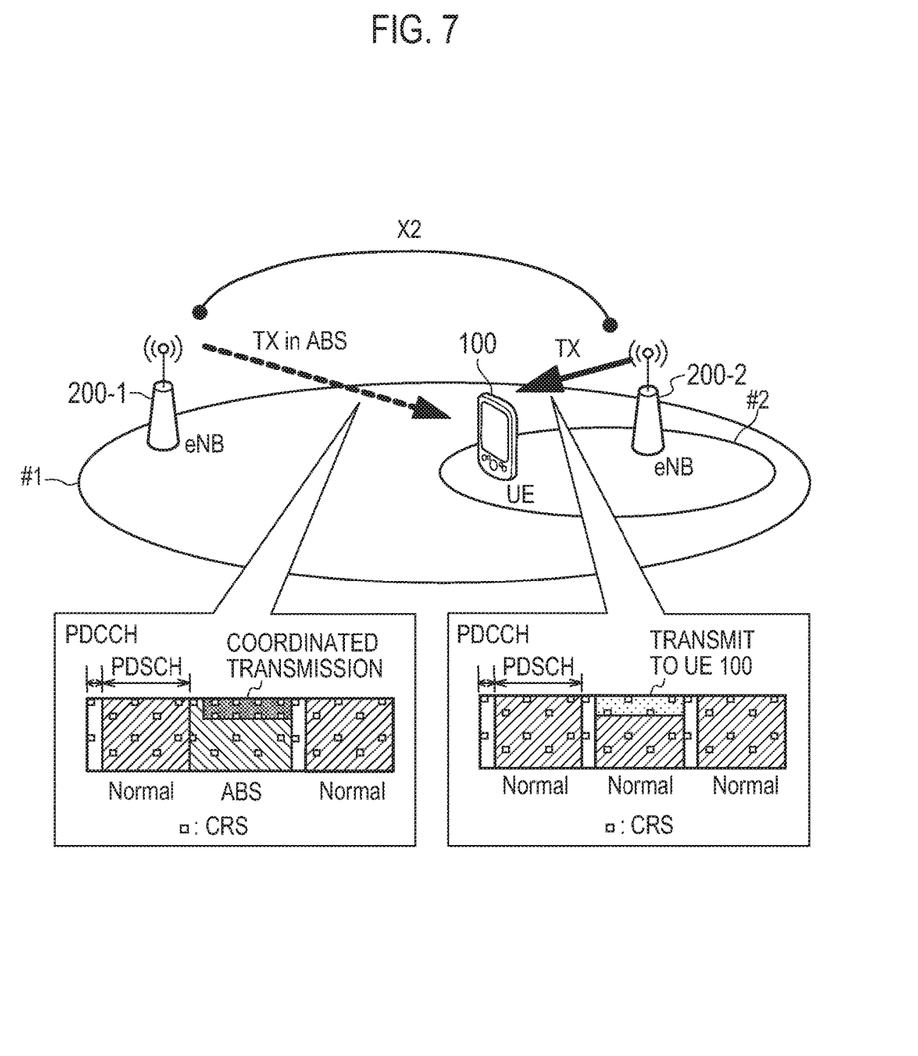
FIG. 7 is a diagram for describing a communication control method according to the embodiment.

FIG. 7 is a diagram for describing a communication control method according to the embodiment.

As shown in FIG. 7, the communication control method according to the embodiment is used in a mobile communication system in which the ABS is set in the cell #1 to suppress the interference from the cell #1 to the cell #2. The communication control method includes a coordinated transmission step of performing, in the ABS, a coordinated transmission from the cell #1 and the cell #2, to the UE 100 connected to the cell #2. The UE 100 connected to the cell #2 receives, in the ABS, data transmitted by the coordinated transmission from the cell #1 and the cell #2. This improves a reception quality in the UE 100 by utilizing a radio resource corresponding to the ABS, and thus, it is possible to implement an effective utilization of the ABS.

In the embodiment, in the coordinated transmission step, the cell #1 does not use a PDCCH resource of the ABS but uses at least a part of a PDSCH resource of the ABS to perform the coordinated transmission. In other words, the cell #1 restricts the use of the PDCCH resource of the ABS and cancels the use restriction of at least a part of the PDSCH resource of the ABS to perform the coordinated transmission. Thus, when the use of the PDCCH resource of the ABS is restricted (when the PDCCH resource is not used), it is possible to suppress the interference of the PDCCH resource of the cell #2 corresponding to the PDCCH resource of the ABS.

In the embodiment, in the coordinated transmission step, the cell #1 performs, in the ABS, the coordinated transmission while avoiding the use of the PDSCH resource corresponding to a CRS resource of the cell #2 (that is, a resource element in which a CRS is arranged). As a result, even when the coordinated transmission is performed in the ABS, it is possible to suppress, in the cell #2, the interference of the CRS. It is possible to identify the CRS resource of the cell #2 from the PCI of the cell #2. Alternatively, when CRS related information of the cell #2 may be notified from the cell #2 to the cell #1 to identify the CRS resource of the cell #2.

In the embodiment, the communication control method further includes: a step of transmitting information indicating the ABS from the eNB 200-1 that manages the cell #1 to an eNB 200-2 that manages the cell #2; and a step of transmitting coordinated transmission information for performing the coordinated transmission from the eNB 200-2 to the eNB 200-1. In the coordinated transmission step, the eNB 200-1 that receives the coordinated transmission information performs the coordinated transmission on the basis of the coordinated transmission information. As a result, it is possible to autonomously perform the coordinated transmission between the eNBs 200.

The information indicating the ABS is "ABS Pattern Info" included in "ABS Information" sent on an X2 interface. The coordinated transmission information is sent on the X2 interface. Alternatively, the coordinated transmission information may be sent on an S1 interface.

In the embodiment, the coordinated transmission information is information for requesting to perform the coordinated transmission. As a result, it is possible to request implementation of the coordinated transmission from the eNB 200-2 to the eNB 200-1. When there is a UE 100 having a poor reception state among a plurality of UEs 100 connected to the cell #2, the eNB 200-2 may request implementation of the coordinated transmission. The UE 100 having a poor reception state is a UE 100 located at a coverage edge (that is, a cell edge) of the cell #2, for example.

In the embodiment, the communication control method further includes a step of performing beforehand, by the eNB 200-2, scheduling of the UE 100 for the ABS. The coordinated transmission information includes scheduling information obtained by the scheduling (pre-scheduling). The scheduling information is at least one of: a resource block assigned to the UE 100 in the ABS; and a transport format applied, in the ABS, to the UE 100. As a result, the eNB 200-1 that receives the coordinated transmission information is capable of transmission from the cell #1 by the resource block matching the cell #2 and/or by the transport format. Here, "performing beforehand the scheduling of the UE 100 for the ABS" means to determine, at a timing earlier than at least the ABS, the resource block and/or the transport format corresponding to the ABS. The scheduling may be performed at a timing earlier by several subframes than the ABS, taking into consideration a delay time of the X2 interface (or the S1 interface).

In the embodiment, the coordinated transmission information includes data (specifically, user data) scheduled be transmitted, in the ABS, from the cell #2 to the UE 100. As a result, the eNB 200-1 that receives the coordinated transmission information is capable of transmitting, from the cell #1, the same data as the data transmitted by the cell #2 to the UE 100. Here, the data may be data to which the above-described transport format is applied. In this case, the above-described scheduling information may not need to include the transport format applied, in the ABS, to the UE 100.

In the embodiment, the coordinated transmission is JT (Joint Transmission) in which the same data is transmitted, by the same time-frequency resource and the same transport format, from the cell #1 and the cell #2. As a result, it is possible to obtain a gain by composing the data in the UE 100. Here, the "same time-frequency resource" is the same subframe and the same resource block.

Operation Sequence According to Embodiment

Figure 8:
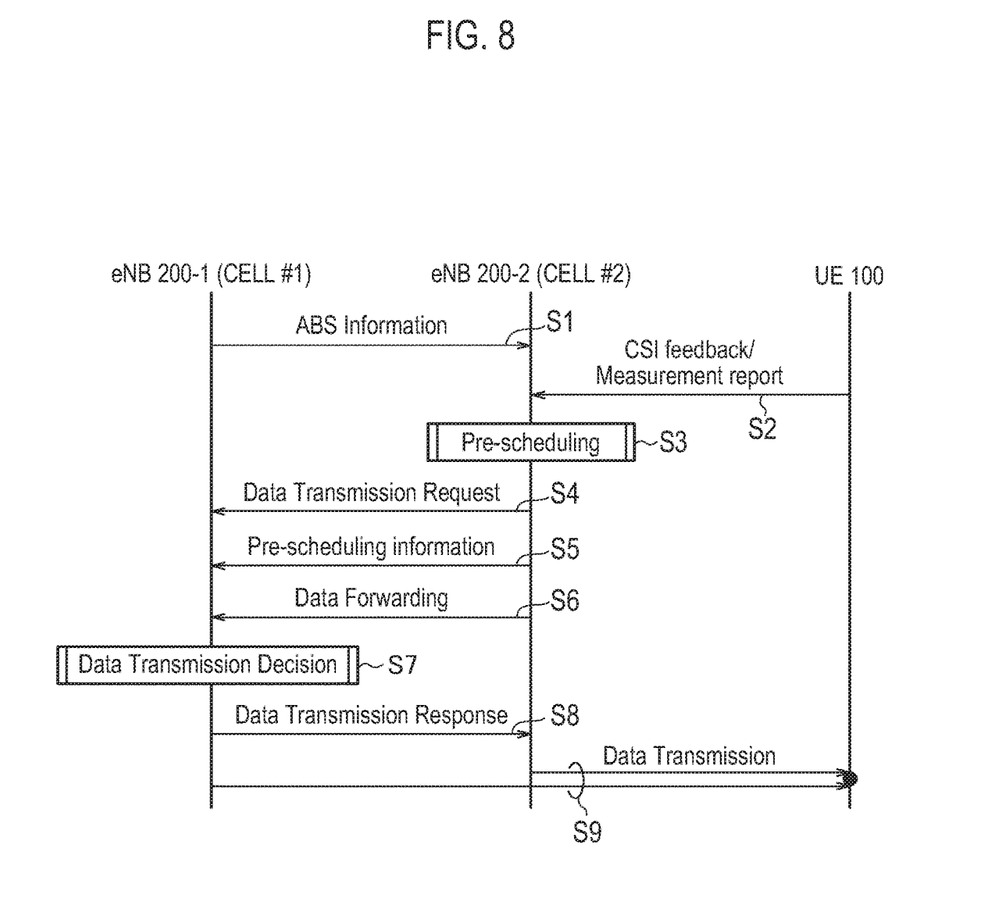
FIG. 8 is an operation sequence chart according to the embodiment.

FIG. 8 is an operation sequence chart according to the embodiment. In FIG. 8, the UE 100 is in a state of establishing a connection with the cell #2.

As shown in FIG. 8, in step S1, the eNB 200-1 transmits information indicating the ABS set in the cell #1, to the eNB 200-2. The eNB 200-2 that receives the information identifies, on the basis of the information, the ABS set in the cell #1. Before step S1, the setting of the ABS in the cell #1 may be requested from the eNB 200-2 to the eNB 200-1.

In step S2, the UE 100 transmits channel state information (CSI) and a measurement report, to the cell #2. Specifically, the UE 100 generates, on the basis of the CRS and the CSI-RS received from the cell #2, a CSI on a channel state with the cell #2, and feeds the CSI back to the cell #2. Further, on the basis of the CRS received from each of the serving cell (cell #2) and the neighboring cell (cell #1), the UE 100 generates the measurement report on a reception state of each cell, and transmits the measurement report to the cell #2.

In step S3, the eNB 200-2 performs beforehand, on the basis of the CSI from the UE 100, scheduling (that is, pre-scheduling) of the UE 100 for the ABS. As described above, by the pre-scheduling, a resource block assigned, in the ABS, to the UE 100, and a transport format applied, in the ABS, to the UE 100, for example.

In step S4, the eNB 200-2 transmits a data transmission request (coordinated transmission information) to request performing of the coordinated transmission from the cell #1, to the eNB 200-1. Step 4 may be performed before step S2 or step S3.

In step S5, the eNB 200-2 transmits scheduling information (coordinated transmission information) obtained by the pre-scheduling, to the eNB 200-1.

In step S6, the eNB 200-2 transmits data (coordinated transmission information) scheduled be transmitted, in the ABS, from the cell #2 to the UE 100, to the eNB 200-1. As a result, the data scheduled be transmitted, in the ABS, from the cell #2 to the UE 100 is shared in the eNB 200-1 and the eNB 200-2.

In step S7, the eNB 200-1 determines on the basis of the coordinated transmission information from the eNB 200-2 whether or not to perform the coordinated transmission in the ABS. Step S7 may be performed immediately after step S4. Here, description proceeds with an assumption that it is determined that the coordinated transmission is performed in the ABS.

In step S8, the eNB 200-1 transmits a response indicating to perform the coordinated transmission, to the eNB 200-2. Further, when in the neighborhood of the cell #1, there is a cell other than the cell #2 and when the ABS is notified to the neighboring cell other than the cell #2, the eNB 200-1 may transmit a notification indicating to perform the transmission in the ABS, to the neighboring cell. The notification includes information indicating a resource block in which the transmission is performed.

In step S9, the eNB 200-2 (cell #2) transmits, in the ABS set by the cell #1, the data to the UE 100. Further, in the ABS, the eNB 200-1 (cell #1) transmits the data to the UE 100, by the coordinated transmission based on the coordinated transmission information.

Summary of Embodiment

The communication control method according to the embodiment is used in a mobile communication system in which an ABS is set in the cell #1 to suppress an interference from the cell #1 to the cell #2. The communication control method includes a coordinated transmission step of performing a coordinated transmission, in the ABS, from the cell #1 and the cell #2, to the UE 100 connected to the cell #2. This improves a reception quality in the UE 100 by utilizing a radio resource corresponding to the ABS, and thus, it is possible to implement an effective utilization of the ABS.

[Modification]

In the above-described embodiment, in the coordinated transmission step, the eNB 200-1 (cell #1) performs, in the ABS, the coordinated transmission while avoiding the use of the PDSCH resource corresponding to the CRS resource of the cell #2. However, instead of such a method, the following method may be employed. Specifically, the eNB 200-1 (cell #1) transmits, in the ABS, the CRS having the same sequence as the CRS of the cell #2, by the same resource element as the CRS resource of the cell #2. As a result, even when the coordinated transmission is performed in the ABS, it is possible to suppress, in the cell #2, the interference of the CRS.

Other Embodiments

In the above-described embodiment, as an example of the coordinated transmission, JT (Joint Transmission) is described. However, the coordinated transmission may be, in addition to the JT, DPS (Dynamic Point Selection) or CS (Coordinate Scheduling). In the DPS and the CS, the cell #1 and the cell #2 ensures the same radio resource, and performs a selective transmission to the UE 100.

Further, the coordinated transmission may be CB (Coordinate Beamforming) in addition to the JT, the DPS, and the CS. In the CB, a plurality of cells cooperate with one another to perform beamforming and null steering. For example, the cell #1 performs, in the ABS, the coordinated transmission by the JT to a UE 100 connected to a cell other than the cells #1 and #2 and performs the null steering on a UE 100 connected to the cell #2.

In the above-described embodiment, an example in which the present invention is applied to the HetNet is described; however, in addition to the HetNet, the present invention may be applied to a network including the same type of cell (cells having the same coverage size).

Furthermore, in the above-described embodiment, the cell #1 and the cell #2 are managed by the different eNBs 200; however, the cell #1 and the cell #2 may be managed by the same eNB 200 as well as by the different eNBs 200.

In the above-described embodiment, as an example of the mobile communication system, the LTE system is described; however, the present invention may be applied not only to the LTE system but also to a system other than the LTE system.

It is noted that the entire content of Japanese Patent Application No. 2013-224774 (filed on Oct. 29, 2013) is incorporated in the present specification by reference.

INDUSTRIAL APPLICABILITY

According to the present invention, it is possible to implement an effective utilization of a use-restricted subframe (ABS).

The invention claimed is:

1. A communication control method used in a mobile communication system in which in order to suppress an interference from a first cell to a second cell, a use-restricted subframe is set in the first cell, the method comprising:
   transmitting, by a second base station that manages the second cell, to a first base station that manages the first cell, coordinated transmission information for requesting to perform a coordinated transmission from the first cell and the second cell to a user terminal connected to the second cell, the coordinated transmission information including data scheduled to be transmitted from the second cell to the user terminal through the coordinated transmission; and
   performing, in the use-restricted subframe, the coordinated transmission of the data, from the first cell and the second cell to a user terminal connected to the second cell.

2. The communication control method according to claim 1, wherein
   the first cell uses at least a part of a PDSCH (Physical Downlink Shared Channel) resource of the use-restricted subframe to perform the coordinated transmission, without using a PDCCH (Physical Downlink Control Channel) resource of the use-restricted subframe.

3. The communication control method according to claim 2, wherein
the first cell performs, in the use-restricted subframe, the coordinated transmission while avoiding a use of the PDSCH resource corresponding to a CRS (Cell specific Reference Signal) resource of the second cell.

4. The communication control method according to claim 1, further comprising:
transmitting information indicating the use-restricted subframe from the first base station to the second base station.

5. The communication control method according to claim 4, further comprising:
performing beforehand, by the second base station, scheduling of the user terminal for the use-restricted subframe, wherein
the coordinated transmission information includes scheduling information obtained by the scheduling.

6. The communication control method according to claim 5, wherein
the scheduling information is at least one of: a resource block assigned, in the use-restricted subframe, to the user terminal; and a transport format applied, in the use-restricted subframe, to the user terminal.

7. The communication control method according to claim 1, further comprising:
determining, by the first base station, based on the coordinated transmission information, whether to perform the coordinated transmission of the data, wherein
the coordinated transmission of the data is performed upon the first base station determining to perform the coordinated transmission of the data.

8. A first base station that manages at least a first cell in a mobile communication system in which in order to suppress an interference from the first cell to a second cell, a use-restricted subframe is set in the first cell, the base station comprising:
a controller configured to:
receive from a second base station that manages the second cell, coordinated transmission information for requesting to perform a coordinated transmission from the first cell and the second cell to a user terminal connected to the second cell, the coordinated transmission information including data scheduled to be transmitted from the second cell to the user terminal through the coordinated transmission; and
control the first cell so as to perform, in the use-restricted subframe, the coordinated transmission of the data, to the user terminal.

* * * * *